United States Patent Office

3,243,297
Patented Mar. 29, 1966

3,243,297
PHOTOGRAPHIC FILM
Helfried Klockgether, Helmut Reuss, and Hans Ulrich, Leverkusen, Germany, assignors to Agfa Aktiengesellschaft, Leverkusen, Germany, a corporation of Germany
No Drawing. Filed Mar. 7, 1963, Ser. No. 263,390
Claims priority, application Germany, Mar. 27, 1962, A 39,818
6 Claims. (Cl. 96—87)

The invention relates to a process for the production of photographic materials comprising a support of a hydrophobic polycarbonate and at least one hydrophilic, light-sensitive layer, an intermediate subbing layer being applied to the support so as to improve adhesion or bonding between the hydrophilic and hydrophobic layers.

It is a known problem, in the production of photographic film materials, to produce adequate bonding between a hydrophilic, light-sensitive layer and the, usually hydrophobic, support layer. Usually, these difficulties are overcome by using an intermediate layer to provide the connection between the support and the photographic emulsion. The bonding must be so strong that no separation of the layers occurs, neither when dry nor when wet during the processing in the baths.

It is known that mixed acetals of, advantageously highly-polymerised polyvinyl alcohol with aldehydes containing water-solubilizing groups and aldehydes without water-solubilizing groups, which mixed acetals are soluble in organic solvents and readily-softened in water, are very suitable as subbing layers for supports based on cellulose ester, polyvinyl chloride or copolymers containing vinyl chloride and polycarbonates based on di-monohydroxyaryl alkanes.

The aforementioned mixed acetals can be obtained by a conventional process, for example, by heating the components for several hours in methanolic solution with sulphuric acid as catalyst. Examples of aldehydes with water-solubilizing groups are aromatic aldehydes which are substituted in the aromatic nucleus by carboxyl, sulphonic acid or hydroxy groups, for example, benzaldehyde-2-sulphonic acid, benzaldehyde-2,2-disulphonic acid and p-hydroxy benzaldehyde. Examples of aldehydes without water-solubilizing groups are araliphatic and aliphatic aldehydes, for example, benzaldehyde, tolyl aldehyde, p-chlorobenzaldehyde and hydrocinnamaldehyde.

The most favorable ratio between aldehydes with water-solubilizing groups and those without water-solubilizing groups depends upon the nature of the aldehydes. It has, however, been found that, in general, a molecular excess of aldehydes without water-solubilizing groups is necessary for the production of a sufficient degree of solubility in organic solvents.

The degree of acetalization can vary, but the best results are obtained when 50 to 70% of all hydroxyl groups in the polyvinyl alcohol have been acetalized.

For producing the intermediate layer, the mixed acetals are preferably dissolved in a proportion of 0.75 to 1.25% in a mixture of methanol and one or more other organic solvents, for example, acetone, tetrahydrofurane or dioxane.

The bonding effect is improved when these mixed acetals are used in admixture with compounds of high molecular weight containing hydroxyl groups, such as those which are formed:

(1) By copolymerizing a hydrophobic monomer (e.g. vinyl chloride, styrene or a vinyl ether) with a hydrophillic monomer containing hydroxyl groups (e.g. allyl alcohol or hydroxystyrene).

(2) By copolymerizing a hydrophobic monomer (e.g., vinyl chloride, vinylidene chloride, styrene or a vinyl ether) with an easily saponified monomer containing esterified hydroxyl groups (e.g. vinyl acetate, vinyl propionate or vinyl butyrate) and saponifying the copolymer.

(3) By partial saponification of a hydrophobic ester of polyvinyl alcohol or of cellulose.

Preferred are partially saponified copolymers of vinyl chloride or vinylidene chloride and an organic vinyl ester, for example vinyl acetate, vinyl propionate or vinyl butyrate, in particular a partially saponified copolymer of vinyl chloride and vinyl acetate. These partially saponified copolymers are produced by known methods by saponification in methanol solution with sulphuric acid as catalyst, merely the organic ester groups being partially saponified. Suitable saponified copolymers contain approximately 45–70% by weight of vinyl chloride, 5–30% by weight of vinyl hydroxide and 10–40% by weight of vinyl acetate or another organic vinyl ester such as vinyl propionate, vinyl butyrate or vinyl benzoate. Copolymers of vinyl chloride and $\alpha,\beta$-unsaturated carboxylic acids or partially saponified copolymers of vinyl chloride and esters of the aforementioned acids can alternatively be used.

The bonding effects produced by an intermediate layer comprising a mixture of mixed acetals and substances containing hydroxyl groups generally satisfy requirements. It is only with those types of films which are immersed in photographic baths for a very long time or are subjected to particular mechanical stress when wet that certain difficulties arise. In such circumstances the photographic emulsion can be displaced from the support when wet.

In addition, the solubility in ethanol of the intermediate layer is, sometimes, particularly disadvantageous. In order to produce more rapid drying, or for technical reproduction purposes, it is quite usual, after the film is processed in the photographic baths, to wash it in ethanol or in ethanol with dyestuff additives. This aftertreatment causes separation of the photographic layer after a short time.

It has now been found that these defects can be eliminated by adding a third polymeric component to the combination of mixed acetals and hydroxy groups containing polymers described above. Suitable are linear copolymers of unsaturated acid anhydrides with other polymerizable monomers. The anhydrides of maleic, citraconic and itaconic acid can, for example, be used as unsaturated anhydrides, the best results being obtained with copolymers of maleic anhydride. Such olefins as ethylene, propylene and butylene, such vinyl aromatic substances as styrene and vinyl toluene, vinyl esters, preferably of lower aliphatic carboxylic acid, e.g. vinyl acetate, alkyl vinyl ethers with alkyl groups containing up to 5 carbon atoms in particular vinyl methylether, or vinyl butylether and acrylic acid derivatives can be used as other copolymerizable compounds.

These copolymers are prepared by known methods; see for example, U.S. patent specification No. 2,913,437 for the production of a copolymer of a simple olefin and maleic anhydride. The production of a copolymer of maleic anhydride and vinyl methyl ether is described in U.S. patent specification No. 2,047,398, and that with vinyl acetate is described in Belgian patent specification No. 584,365.

These copolymers should, advantageously, have an acid anhydride content of 40 to 50 mol percent, calculated on the copolymers.

Since the mixtures of substances as described consisting of mixed acetals of polyvinyl alcohol and polymers containing hydroxyl groups, are always cast from organic solvents, advantageously mixtures of methanol and acetone, only those copolymers which are adequately soluble in organic solvents need be considered.

The quantity of the third component, which probably acts as cross-linking agent, can be varied within wide limits without substantially influencing its efficacy. Good results have been produced with quantities of 8 to 25%, based on solid substance. In order to effect a rapid cross-linking, it is expedient that the intermediate bonding layer, after having been applied to the film support, be heated for a few minutes to temperatures above 80° C.; this is, in any case, necessary to reduce the residual solvent content, which has a disadvantageous effect.

The proportion of the mixed acetal and the polymer containing hydroxy groups can vary within wide limits, preferred are mixtures of 10 parts of the mixed acetal to 1–15 parts of the other component.

The intermediate layers according to the invention do not undergo any harmful swelling when the photographic material is wet. Furthermore, the solubility of the intermediate layer in ethanol, or in solutions containing ethanol, is so greatly reduced that the photographic emulsion layer is given a strength fully adequate for practical purposes.

The same effects could not be produced with other additives which act as cross-linking agents, such as aldehydes, methylol compounds or compounds containing epoxide groups.

The subbing layers according to the invention are operative with supports of polycarbonates. The said polymers are a special class of polyesters derived from carbonic acid and bisphenylol compounds. In particular suitable are those polymers based on bisphenylol alkanes. Polycarbonates to be used as supports for photographic films are described in British patent specifications 808,629, 853,587, 862,205 and 853,588.

The process is more fully illustrated by the following examples:

Example 1

A foil 0.2 mm. thick, consisting of 4,4'-dihydroxy-diphenyl dimethyl methane polycarbonate is treated by the immersion method with the following solution:

10 g. of mixed acetal consisting of

| | Percent |
|---|---|
| Benzaldehyde disodium sulphonate acetal | 33.5 |
| Benzaldehyde acetal | 35.2 |
| Polyvinyl alcohol | 31.3 |

3 g. of a partially-saponified copolymer of vinyl chloride and vinyl acetate with the following composition:

| | Percent |
|---|---|
| Vinyl chloride | 63.2 |
| Vinyl alcohol | 25.3 |
| Vinyl acetate | 11.5 |

3 g. of a cross linking agent with the constitution:

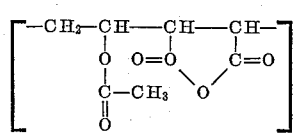

(The polymer has a specific viscosity of 4.5 at 20° C. in 1% solution in dimethyl formamide.)

335 cc. of methanol
665 cc. of acetone

After applying the solution, the foil is dried at 100 to 120°. Thereafter, it is cast with a silver halide emulsion, which adheres satisfactorily both in the dry and wet state, even with extremely long rinsing and mechanical stressing when wet. In addition, the emulsion is still firmly attached to the support after the film, after treatment in the photographic baths, is further treated with ethanol for 30 minutes.

Example 2

A foil 0.1 mm. thick, consisting of 4,4'-dihydroxy-diphenyl methane polycarbonate, is treated, by dipping, with the following solution:

8.1 g. of mixed acetal consisting of

| | Percent |
|---|---|
| Benzaldehyde disoduim sulphonate acetal | 35.1 |
| Benzaldehyde acetal | 36.7 |
| Polyvinyl alcohol | 28.2 |

9 g. of a partially-saponified copolymer of vinyl chloride and vinyl acetate with the following composition:

| | Percent |
|---|---|
| Vinyl chloride | 60.5 |
| Vinyl alcohol | 23.2 |
| Vinyl acetate | 16.3 |

1.5 g. of a cross-linking agent of the following constitution:

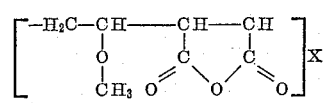

(The copolymer has a specific viscosity of 5 at 20° C. in 1% solution in dimethyl formamide.)

335 cc. of methanol
665 cc. of acetone

The foil is further processed by the method indicated in Example 1. In this case also, a very good bonding effect and resistance to ethanol is produced.

Example 3

A foil 0.140 mm. thick, consisting of 4,4'-dihydroxydiphenyl dimethyl methane polycarbonate, is treated by dipping with the following solution:

8.1 g. of mixed acetal consisting of

| | Percent |
|---|---|
| Benzaldehyde disodium sulphonate acetal | 28.5 |
| Benzaldehyde acetal | 37.9 |
| Polyvinyl alcohol | 33.6 |

3 g. of a partially-saponified copolymer of vinyl chloride and vinyl acetate of the following composition:

| | Percent |
|---|---|
| Vinyl chloride | 66.6 |
| Vinyl alcohol | 20.1 |
| Vinyl acetate | 13.3 |

1 g. of a cross-linking agent of the following constitution:

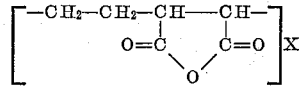

(This copolymer has a specific viscosity of 1.0 at 25° C. in 1% solution in dimethyl formamide.)

335 cc. of methanol
665 cc. of acetone

The foil is further processed by the method indicated in Example 1. In this case also is produced an excellent bonding action and resistance to ethanol.

We claim:
1. A photographic film element comprising a film support of a high-molecular-weight polycarbonate supporting a light-sensitive silver halide emulsion, said emulsion being bonded to the said film support by an interposed subbing layer of a subbing mixture comprising
   (1) mixed acetals consisting essentially of the condensation products of a polyvinyl alcohol with a mixture of at least two aldehydes, one of which is an aromatic aldehyde, the aromatic nucleus of which contains a substituent of the group consisting of carboxy, hydroxy and sulfo radicals and

(2) partially spaonified copolymers of a hydrophobic monomer selected from the class consisting of vinyl chloride, vinylidene chloride, styrene and vinyl ethers with akyl groups containing up to 5 carbon atoms with esters of vinyl alcohol and lower aliphatic carboxylic acids and (3) a copolymer of polymerizable anhydrides selected from the class consisting of maleic anhydride, citraconic anhydride and itaconic anhydride with a component selected from the class consisting of ethylene, propylene, butylene, esters of vinyl alcohol with lower aliphatic acids, alkyl vinyl esters with alkyl groups containing up to 5 carbon atoms, styrene and vinyl toluene.

2. A photographic film element according to claim 1, wherein the said subbing layer contains between about 1 to about 15 parts by weight of the partially saponified copolymer to 10 parts by weight of the mixed acetal, in which mixed acetal between 50 to 70% of the hydroxyl radicals of the polyvinyl alcohol have been acetalized, and 8–25% by weight based on the dried subbing layer of the copolymer containing the anhydrides.

3. A photographic film element according to claim 2, wherein the said subbing layer comprising a mixture of
(1) a mixed acetal of polyvinyl alcohol with benzaldehyde di-sulfonate and benzaldehyde and
(2) a partially saponified copolymer of vinyl chloride and vinyl acetate and
(3) a copolymer of maleic anhydride and vinyl acetate.

4. A photographic film element according to claim 2, wherein the said subbing layer comprising a mixture of
(1) a mixed acetal of polyvinyl alcohol with benzaldehyde di-sulfonate and benzaldehyde and
(2) a partialy saponified copolymer of vinyl chloride and vinyl acetate and
(3) a copolymer of maleic anhydride and vinyl methyl ether.

5. A photographic film element according to claim 2, wherein the said subbing layer comprising a mixture of
(1) a mixed acetal of polyvinyl alcohol with benzaldehyde di-sulfonate and benzaldehyde and
(2) a partially saponified copolymer of vinyl chloride and vinyl acetate and
(3) a oopolymer of maleic anhydride and ethylene.

6. A photographic film element according to claim 2, wherein the said subbing layer comprising a mixture of
(1) a mixed acetal of polyvinyl alcohol with benzaldehyde di-sulfonate and benzaldehyde and
(2) a partially saponified copolymer of vinyl chloride and vinyl acetate and
(3) a copolymer of maleic anhydride and vinyl butyl ether.

References Cited by the Examiner

UNITED STATES PATENTS

| | | | |
|---|---|---|---|
| 2,419,880 | 4/1947 | Blyler et al. | 260—29.6 |
| 2,609,350 | 9/1952 | Spatt | 260—29.6 |
| 3,071,466 | 1/1963 | Klockgether et al. | 96—87 |

NORMAN G. TORCHIN, *Primary Examiner.*

T. J. HOFFMANN, R. H. SMITH, *Assistant Examiners.*